United States Patent
Campisano et al.

(10) Patent No.: US 10,156,882 B2
(45) Date of Patent: Dec. 18, 2018

(54) MULTI-CORE DYNAMIC FREQUENCY CONTROL SYSTEM

(71) Applicant: International Business Machines Corporation, Armonk, NY (US)

(72) Inventors: Francesco A. Campisano, Austin, TX (US); Alan J. Drake, Round Rock, TX (US); Michael S. Floyd, Cedar Park, TX (US); David T. Hui, Poughkeepsie, NY (US); Pawel Owczarczyk, Highland, NY (US); Marshall D. Tiner, Elgin, TX (US); Xiaobin Yuan, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 14/879,269

(22) Filed: Oct. 9, 2015

(65) Prior Publication Data

US 2017/0102732 A1  Apr. 13, 2017

(51) Int. Cl.
| | |
|---|---|
| G06F 1/12 | (2006.01) |
| G06F 13/42 | (2006.01) |
| H04L 5/00 | (2006.01) |
| H04L 7/00 | (2006.01) |
| G06F 1/32 | (2006.01) |
| G06F 1/08 | (2006.01) |

(52) U.S. Cl.
CPC .............. *G06F 1/3206* (2013.01); *G06F 1/08* (2013.01); *G06F 1/324* (2013.01); *G06F 1/3296* (2013.01); *Y02D 10/126* (2018.01); *Y02D 10/172* (2018.01)

(58) Field of Classification Search
CPC . G06F 1/08; G06F 1/12; G06F 1/3206; G06F 1/324; G06F 1/3296
See application file for complete search history.

(56) References Cited

U.S. PATENT DOCUMENTS

| | | | |
|---|---|---|---|
| 6,697,952 B1 * | 2/2004 | King | G06F 1/26 327/538 |
| 8,281,164 B2 | 10/2012 | Kim | |
| 8,405,413 B2 | 3/2013 | Carpenter et al. | |
| 8,941,426 B1 | 1/2015 | Drake et al. | |
| 9,000,822 B2 | 4/2015 | Drake et al. | |

(Continued)

OTHER PUBLICATIONS

Campisano et al., "Multi-Core Dynamic Frequency Control System," U.S. Appl. No. 14/923,908, filed Oct. 27, 2015, 26 pages.

(Continued)

*Primary Examiner* — Thomas C Lee
*Assistant Examiner* — Zhipeng Wang
(74) *Attorney, Agent, or Firm* — Van Leeuwen & Van Leeuwen; Steven L. Bennett

(57) ABSTRACT

An approach is provided in which a multi-core processor's first core determines whether it controls a system frequency that drives a group of cores included in the multi-core processor. When the first core is not controlling the system frequency for the group of cores, the first core uses an internal voltage control module to provide control information to the first core's programmable voltage regulator and, in turn, independently control the first core's voltage level. When the first core is controlling the system frequency, the first core receives voltage control information from pervasive control to control the first core's voltage levels.

10 Claims, 6 Drawing Sheets

(56) References Cited

U.S. PATENT DOCUMENTS

| | | | |
|---|---|---|---|
| 2007/0096775 A1* | 5/2007 | Elgebaly | G06F 1/3203 327/105 |
| 2010/0083021 A1* | 4/2010 | Allarey | G06F 1/08 713/330 |
| 2012/0072749 A1* | 3/2012 | Conroy | G06F 1/324 713/322 |
| 2012/0079290 A1* | 3/2012 | Kumar | G06F 1/26 713/300 |
| 2014/0157284 A1* | 6/2014 | Sambasivan | G06F 9/4893 718/105 |
| 2014/0237302 A1 | 8/2014 | Berry et al. | |
| 2015/0046721 A1 | 2/2015 | Drake et al. | |
| 2015/0081044 A1* | 3/2015 | Allen-Ware | G05B 13/024 700/28 |
| 2015/0109043 A1 | 4/2015 | Drake et al. | |
| 2015/0113304 A1* | 4/2015 | Kim | G06F 1/324 713/322 |

OTHER PUBLICATIONS

"List of IBM Patents or Patent Applications Treated as Related," Letter from Leslie A. Van Leeuwen, Oct. 27, 2015, 1 page.

\* cited by examiner

300 →

| CPM Output | Core State | VCM Translation Logic | | |
|---|---|---|---|---|
| | | CPM Output | Offset | VCM Translated Output |
| 11111 | Extra margin, decrease V | 00000 | Offset | 48 |
| 11110 | Calibration for V | 00001 | Offset | 56 |
| 11100 | Calibration for Freq | 00011 | Offset | 64 |
| 11000 | Loosing margin, increase V | 00111 | Offset | 72 |
| 10000 | Low margin, increase V | 01111 | Offset | 80 |
| 00000 | No margin, increase V | 11111 | Offset | 96 |

MULTI-CORE DYNAMIC FREQUENCY CONTROL SYSTEM

BACKGROUND

The present disclosure relates to coupling a multi-core processor's dynamic frequency control system to the multi-core processor's dynamic voltage control system to reduce core voltage of cores that are not controlling system frequency.

Multi-core processors provide faster task processing by distributing portions of parallel processing tasks among multiple cores. To achieve parallel processing functionality, multi-core processors synchronize the cores to provide a close coupling between the different cores for memory access tasks, control information passing, etc.

Multi-core processors typically perform trade-offs between operating voltage and operating frequency. When a core requires faster operating frequency, the core typically requires higher voltage. A multi-core processor may use a dynamic frequency control system that automatically adjusts frequencies (system clock) "on the fly" depending upon frequency requirements of the multi-core processor.

Multi-core processors may also implement a dynamic voltage control system to increase or decrease core voltages based upon system requirements. For example, the dynamic voltage control system may increase voltage when the multi-core processor requires increased performance, or decrease voltage to conserve power when the multi-core processor does not require increased performance.

In a multi-core system where one clocking system drives multiple processor cores, a single core may require the system frequency to be increased and, in turn, require a higher voltage. As such, the other cores waste power because they operate at a higher frequency and higher voltage when they do not require the increase in performance.

BRIEF SUMMARY

According to one embodiment of the present disclosure, an approach is provided in which a multi-core processor's first core determines whether it controls a system frequency that drives a group of cores included in the multi-core processor. When the first core is not controlling the system frequency for the group of cores, the first core uses an internal voltage control module to provide control information to the first core's programmable voltage regulator and, in turn, independently control the first core's voltage level. When the first core is controlling the system frequency, the first core receives voltage control information from pervasive control to control the first core's voltage levels.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 3 is a table showing voltage control code output from the voltage control code based upon thermometer code and offset value inputs;

DETAILED DESCRIPTION

Figure 1:
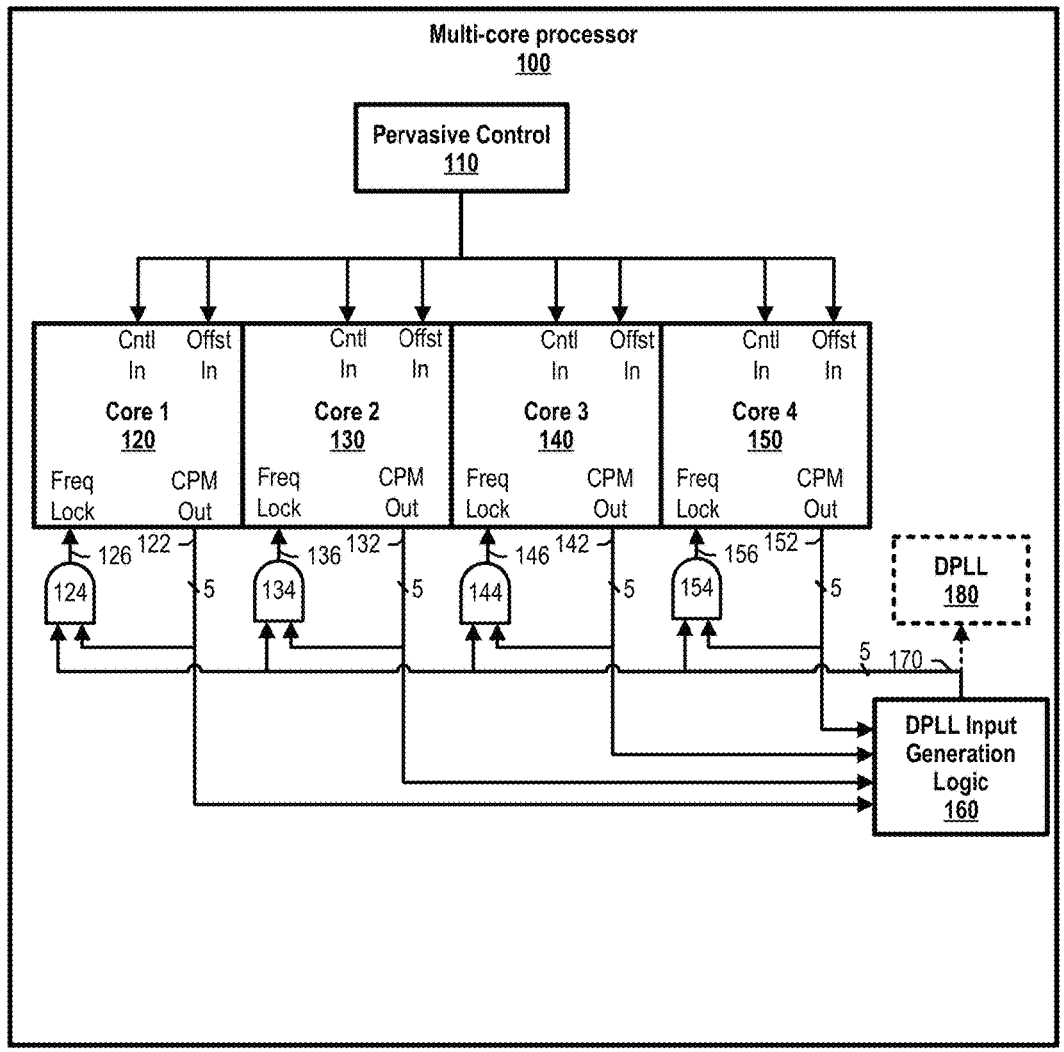
FIG. 1 is a diagram depicting an example of a multi-core processor that couples a dynamic frequency control system to dynamic voltage control systems.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIGS. 1 through 5 disclose a multi-core processor that couples a dynamic frequency control system to a dynamic voltage control system to optimize the multi-core processor's power usage by managing the leakage power on lightly loaded cores while the heavily loaded core(s) control the system frequency.

A multi-core processor, in one embodiment, uses combinatorial logic to determine which core is controlling the system frequency by comparing a Digital PLL (DPLL) input control information to Critical Path Monitor (CPM) information generated by each core, referred to herein as "thermometer code.". When the thermometer code of a particular core matches the DPLL input control information, the combinatorial logic determines that the particular core is controlling the system frequency and asserts a frequency lock signal that feeds into the particular core. When a core's thermometer code does not match the DPLL input control information, the combinatorial lock de-asserts the frequency lock signal.

When a core's frequency lock signal is asserted, indicating that the core is controlling system frequency and is executing a heavy workload, the core uses external pervasive control codes to control the core's programmable voltage regulator and maintain voltage levels to sustain performance requirements. However, when the core's frequency lock is not asserted, indicating that the core is not controlling the system frequency, the core uses voltage control codes generated by an internal voltage control module to control the core's programmable voltage regulator. The internal voltage control module uses the core's thermometer codes and an offset value to provide voltage control codes that reduce the core's voltage level to a point without overtaking frequency control. When the core receives a sudden workload and takes over frequency control, the core's frequency lock signal is asserted and the input control to the programmable voltage regulator is provided by pervasive control.

FIG. 1 is a diagram depicting an example of a multi-core processor that couples a dynamic frequency control system to dynamic voltage control systems. Multi-core processor 100 includes four cores 120, 130, 140, and 150. In one embodiment, multi-core processor 100 may include multiple quadrants of cores and each quadrant includes multiple cores. For example, multi-core processor 100 may include sixteen cores divided into four quadrants and each quadrant includes four cores.

Each of cores 120-150 provide "thermometer code" information to Digital Phase Look Loop (DPLL) input generation logic 160 via lines 122, 132, 142, and 152. The thermometer code is a combination of critical path monitor values from various critical path monitors (CPMs) within each core and changes as the critical path within each core slows down (see FIG. 2 and corresponding text for further details). The CPM's provide real-time feedback on each core's current timing margins. In one embodiment, the CPMs use four delay paths with different mixes of field-effect transistor (FET) and wire delays to approximate the different critical paths that dominate a core over its operating range. In this embodiment, at clock cycle n, a pulse is launched down the delay paths and then captured in a 12-bit edge detector on the following clock cycle. The penetration of the edge into the 12 bits indicates the circuit's timing margin at the given operating point.

DPLL input generation logic 160 receives thermometer control information from each core and generates frequency control 170. In one embodiment, DPLL input generation logic 160 is a bit-wise AND gate that produces a worst case value, passed, as a single value, to DPLL 180. In this embodiment, DPLL 180 has a CPM mode where it monitors the bit position of the thermometer code (frequency control 170) and decreases its output frequency if the bit moves one direction (indicating a CPM detecting a heavy workload). DPLL 180 increases its output frequency if the thermometer code moves the opposite direction, indicating a CPM detecting a reduction in workload. As DPLL 180's frequency change mitigates the workload, the thermometer code is returned to a bit position being monitored, producing a stable system frequency. In this embodiment, internal loop filtering and loop damping may be utilized to adjust the stability of the frequency control system.

Frequency control 170 feeds into DPLL 180 that provides system clock signals to each of cores 120, 130, 140, and 150 (not shown). Frequency control 170 also feeds into combinatorial gates 124, 134, 144, and 154. When frequency control 170 matches one of the thermometer codes from one of the cores, the core's corresponding frequency lock signal is asserted high (signals 126, 136, 146, and 156). Therefore, the core knows that it is controlling the system frequency and uses control input from pervasive control 110 to manage core voltage. However, the other three cores' frequency lock signals are not asserted and the other three cores internally reduce their core voltage to conserve power using their thermometer code and an offset value provided by, for example, pervasive control 110. As discussed in more detail below, the offset value may be set to a static value based upon multi-core processor 100's trade-off configuration to reduce power relative to system failure margin (see FIGS. 2-5 and corresponding text for further details).

Figure 2:
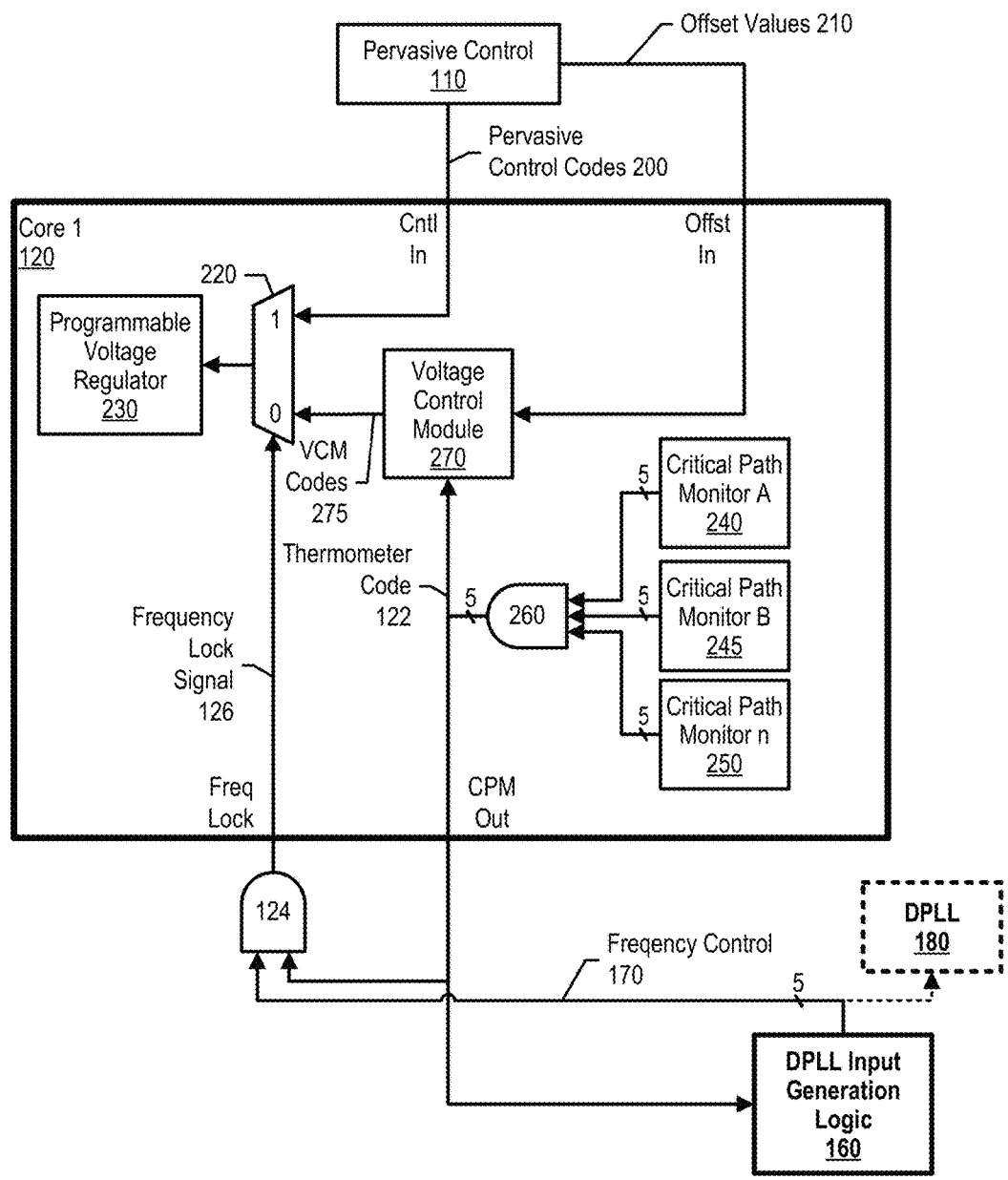
FIG. 2 is a diagram depicting a core that internally mange core voltage levels when is not controlling a system clock.

FIG. 2 is a diagram depicting a core that internally mange core voltage levels when is not controlling a system clock. Core 1 120 uses frequency lock signal 126 to determine whether to select pervasive control codes 200 or voltage control module (VCM) codes 275 as input to programmable voltage regulator 230 via multiplexer 220. As those skilled in the art can appreciate, multiplexer 220 may be a multiplexer or combinatorial logic that provides multiplexer functionality (e.g., AND gates, OR gates, inverters, etc.).

When frequency lock signal 126 is asserted, indicating that core 1 120 is controlling the system clock, multiplexer 220 selects pervasive control codes 200 as input to programmable voltage regulator 230. As such, core 1 120's core voltage is controlled by pervasive control 110.

When frequency lock signal 120 is not asserted, indicating that core 1 120 is not controlling the system clock, multiplexer 220 selects VCM codes 275 as input to programmable voltage regulator 230 to manage core 120's voltage. Voltage control module 270 receives offset values 210 from, for example, pervasive control 110 and thermometer code 122, which is a bitwise combination of critical path monitors A 240, B 245, and n 250. Critical path monitors A 240, B 245, and n 250 monitor critical path areas within core 1 120 and provide real-time feedback on the core 1 120's current timing margins.

In one embodiment, each of critical path monitors A 240, B 245, and n 250 use four delay paths with different mixes of field-effect transistor (FET) and wire delays to approximate the different critical paths that dominate in the core over its operating range. At clock cycle n, a pulse is launched down the delay paths and then captured in a 12-bit edge detector on the following clock cycle. The penetration of the edge into the 12 bits indicates the circuit's timing margin at the given operating point. As shown below, the CPM values show that the edge penetrates the edge detector less and less as the critical path becomes more of an issue:

111111111110 (no critical path issues)
111111111100
111111111000
111111110000
111111100000
111111000000
111110000000
111100000000
111000000000
110000000000
100000000000 (Action needed, system near failure)

Figure 5:
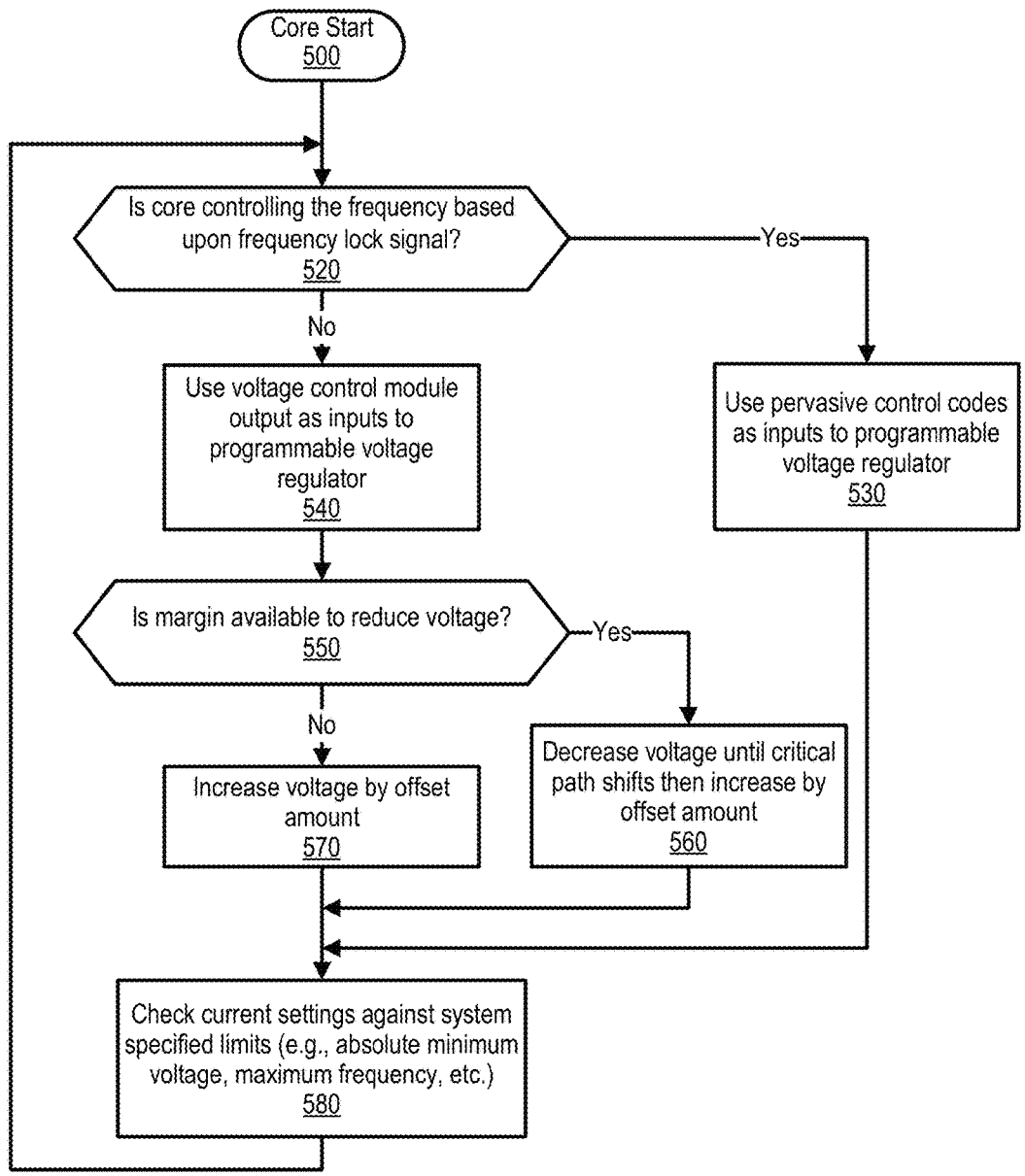
FIG. 5 is a flowchart showing steps taken by each core in a multi-core processor to manage their respective core voltage.

As a result, core 1 120 reduces its core voltage to a level just above critical path failure based on offset values 210 (see FIGS. 3, 5, and corresponding text for further details).

FIG. 3 is a table showing voltage control code output from the voltage control code based upon thermometer code and offset value inputs. As discussed earlier, the CPMs' penetration detection of a pulse edge into an edge detector indicates the core's timing margin at the given operating point. As a simple example, column 310 shows 5 digit CPM outputs where "11111" indicates extra timing margin is available and the core's voltage should be decreased (column 320). As such, column 350 shows that the VCM translated output to the programmable voltage regulator is a low value and, in turn, the programmable voltage regulator reduces the core's voltage.

As core 1 120's voltage reduces and/or as core 1 120's workload increases, the core's timing margin reduces and the thermometer code begins to change. When the thermometer code reaches "1100" or "1000", the core is on the brink of system failure and voltage control module 270 provides voltage control codes to programmable voltage regulator 230 to increase the core's voltage (see FIG. 5 and corresponding text for further details).

Figure 4:
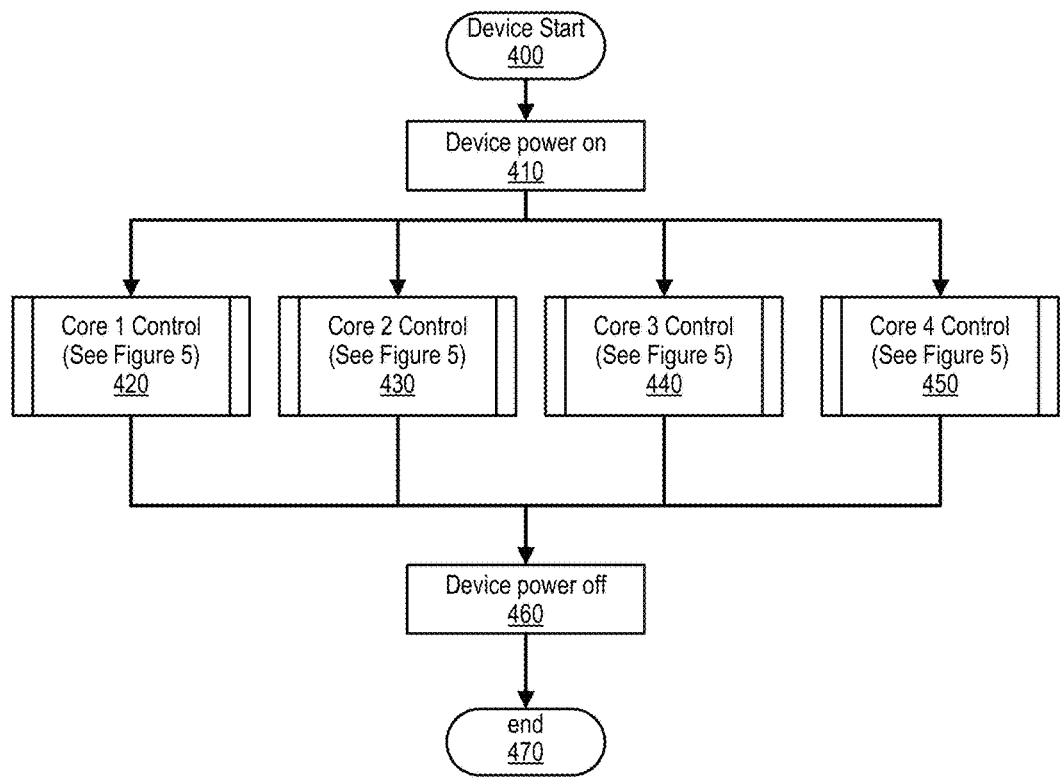
FIG. 4 is a high-level flowchart showing steps taken by a multi-core processor to optimize power savings.

FIG. 4 is a high-level flowchart showing steps taken by a multi-core processor to optimize power savings. Device processing commences at 400 whereupon the multi-core device powers on at step 410. When the device powers on, each core determines whether it is the core that controls system frequency as discussed earlier. Typically, the core with the heaviest workload is the core that controls system frequency. When the cores not controlling the frequency make such determination, each core independently manages their respective core voltage based upon their internal critical path monitor readings and offset value (pre-defined process blocks 420, 430, 440, and 450. See FIG. 5 and corresponding text for further details). Each core controls their programmable voltage regulator according to steps shown in FIG. 5 until the device powers off at 460, whereupon processing ends at 470.

FIG. 5 is a flowchart showing steps taken by each core in a multi-core processor to manage their respective core voltage. FIG. 5 processing commences at 500, whereupon the process determines as to whether the core is controlling the system frequency based upon its frequency lock signal as discussed previously (decision 520). If the core is controlling the system frequency, then decision 520 branches to the 'yes' branch whereupon the process uses pervasive control codes as inputs to control the core's voltage level.

On the other hand, if the core is not controlling the system frequency, then decision 520 branches to the 'no' branch whereupon the core assumes management control of its internal voltage. At step 540, the process uses voltage control codes from the voltage control module as inputs to the programmable voltage regulator. The process determines as to whether timing margin is available to reduce the core voltage based upon the thermometer control codes (decision 550). If timing margin is available to reduce the core voltage such as from a thermometer code reading of all 1's, then decision 550 branches to the 'yes' branch.

At step 560, the process decreases the core voltage until the critical path shifts, then the process increases the voltage control codes by the offset amount. In other words, the process (e.g., programmable voltage regulator 230) decreases the core voltage until the critical path (timing) begins to shift, then increases the core voltage one step. This produces an optimum core voltage that uses minimum power at the present workload. The core's frequency may also be adjusted dynamically given a few requirements, such as the core may not be controlling frequency and the system may have a minimum voltage limit not to be exceeded.

On the other hand, if margin is not available to reduce the core voltage (e.g., thermometer code of "00000"), then decision 550 branches to the 'no' branch. At step 570, the process increases the voltage by the offset amount. At step 580, the process checks current settings against system specified limits (e.g., absolute minimum voltage, maximum frequency, etc.) and loops back to determine whether the particular core is controlling the system frequency. This looping continues until the device powers down as shown in FIG. 4, at which point each core powers down and the steps shown in FIG. 5 are terminated.

Figure 6:
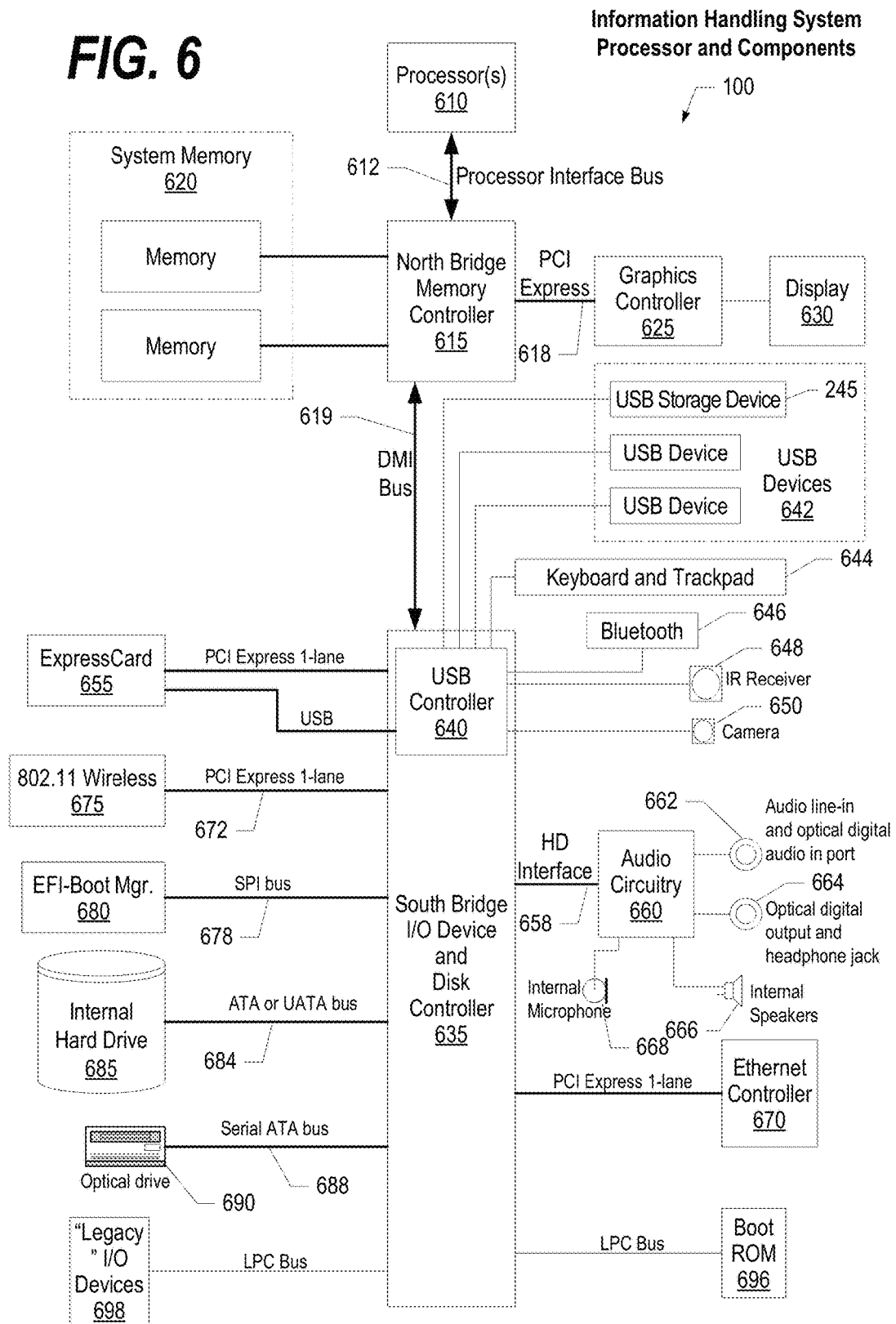
FIG. 6 is a block diagram of an information handling system in which the methods described herein may be implemented.

FIG. 6 illustrates information handling system 600, which is a simplified example of a computer system capable of implementing a multi-core processor as described herein. Information handling system 600 includes one or more processors 610 coupled to processor interface bus 612. One or more of processors 610 may be a multi-core processor that includes features shown in FIGS. 1 through 5. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wireless communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A multi-core processor comprising:
   a plurality of processor cores;
   combinatorial logic that determines which one of the plurality of processor cores controls a system frequency provided to the plurality of processor cores; and
   at least a selected one of the plurality of processor cores further comprises:
      a programmable voltage regulator that regulates a first core voltage within the selected processor core;
      multiplexer logic that provides voltage control codes to the programmable voltage regulator, wherein the voltage control codes are selected by the multiplexer logic from one of a plurality of multiplexer inputs based upon the determination of the combinatorial logic;
      critical path monitor logic that collects critical path measurements within the selected processor core; and
      voltage control logic that provides the voltage control codes to a first one of the plurality of multiplexer inputs, wherein the voltage control logic generates the voltage control codes based upon the critical path measurements and one or more offset values configured to prevent the first core from taking control of the system frequency.

2. The multi-core processor of claim 1 wherein the controlling of the first core voltage further comprises:
   decreasing the first core voltage until the one or more critical path measurements change; and
   increasing the first core voltage based on the one or more offset values.

3. The multi-core processor of claim 1 wherein the controlling of the first core voltage further comprises:
   increasing the first core voltage based on the one or more offset values in response to determining that the first core voltage does not include a voltage margin.

4. The multi-core processor of claim 1 wherein the programmable voltage regulator controls the first core voltage independent from one or more second voltages corresponding to one or more different cores included in the plurality of cores.

5. An information handling system comprising:
   one or more multi-core processors;
   a memory coupled to the one or more multi-core processors; and
   a set of computer program instructions stored in the memory and executed by at least one of the multi-core processors in order to perform actions of:
      determining whether a first core included in a multi-core processor is controlling a system frequency that drives the first core and one or more second cores also included in the multi-core processor; and
      in response to determining that the first core is not controlling the system frequency, controlling a first core voltage of the first core using voltage control codes, independent from one or more second voltages of the one or more second cores, based upon one or more critical path measurements within the first core, wherein the voltage control codes are based upon the one or more critical path measurements and one or more offset values configured to prevent the first core from taking control of the system frequency.

6. The information handling system of claim 5 wherein at least one of the one or more multi-core processors perform additional actions comprising:
   determining that thermometer code information generated from the one or more critical path measurements does not match frequency control information corresponding to the system frequency.

7. The information handling system of claim 6 wherein at least one of the one or more multi-core processors perform additional actions comprising:
   in response to the thermometer code matching the frequency control information, providing pervasive control codes from the multi-core processor to the programmable voltage regulator to control the first core voltage in conjunction with at least one of the one or more second voltages.

8. The information handling system of claim 5 wherein at least one of the one or more multi-core processors perform additional actions comprising:
    providing the voltage control codes generated by voltage control logic internal to the first core to a programmable voltage regulator that controls the first core voltage.

9. The information handling system of claim 5 wherein at least one of the one or more multi-core processors perform additional actions comprising:
    decreasing the first core voltage until the one or more critical path measurements change; and
    increasing the first core voltage based on the one or more offset values.

10. The information handling system of claim 5 wherein at least one of the one or more multi-core processors perform additional actions comprising:
    increasing the first core voltage based on the one or more offset values in response to determining that the first core voltage does not include a voltage margin.

\* \* \* \* \*